United States Patent [19]

Tanaka et al.

[11] Patent Number: 5,179,545
[45] Date of Patent: Jan. 12, 1993

[54] TRACKING CONTROL APPARATUS FOR CONTROLLING THE TRACKING OF A TARGET TRACK

[75] Inventors: Hisamitsu Tanaka; Motoyuki Suzuki; Yoshio Miura, all of Yokohama, Japan

[73] Assignee: Hitachi, Ltd., Tokyo, Japan

[21] Appl. No.: 614,626

[22] Filed: Nov. 16, 1990

[30] Foreign Application Priority Data

Nov. 20, 1989 [JP] Japan .................. 1-299657

[51] Int. Cl.$^5$ .................. G11B 7/00; G11B 7/09
[52] U.S. Cl. .................. 369/32; 369/44.25; 369/44.29
[58] Field of Search .......... 369/44.35–44.38, 369/47, 32, 44.11, 124; 360/77.01, 75, 77.07, 77.06, 77.12, 78.01

[56] References Cited

U.S. PATENT DOCUMENTS

| | | | |
|---|---|---|---|
| 4,338,682 | 7/1982 | Hosaka et al. | 369/44.25 |
| 4,484,319 | 11/1984 | Hoishi et al. | 369/44.28 |
| 4,544,872 | 10/1985 | Hirano et al. | 369/44.29 |
| 4,669,072 | 5/1987 | Miura et al. | 369/44.33 |
| 4,677,602 | 6/1987 | Okano et al. | 369/32 |
| 4,751,695 | 6/1988 | Kaku et al. | 369/44.34 |
| 4,899,325 | 2/1990 | Katsuhara et al. | 369/32 |

FOREIGN PATENT DOCUMENTS 0058141 5/1981 Japan .
0057640 4/1983 Japan .

*Primary Examiner*—Roy N. Envall, Jr.
*Assistant Examiner*—Thang V. Tran
*Attorney, Agent, or Firm*—Antonelli, Terry, Stout & Kraus

[57] ABSTRACT

A tracking control apparatus is provided for controlling a displacement error between a pickup system and a track when reproducing information recording on an information-recording and reproducing medium having tracks on which information is recorded or reproduced. The tracking control apparatus includes on-track detecting means for detecting a light beam is located on the track, traveling-direction detecting means for detecting the direction of the pickup system traveling toward the track from the displacement error and the output signal supplied by the on-track detecting means and outputting a traveling-direction signal representing the traveling direction, track-slippage detecting means for detecting a track-slippage signal representing the direction of the light beam being slipped out of a target track from the traveling-direction signal supplied by the traveling-direction detecting means, and tracking control means for supplying as a control signal the displacement error when the light beam is located on the target track or as a control signal the track-slippage signal supplied by the track-slippage detecting means when the light beam is not spotted on the target track and driving the pickup system in a manner to allowing the light beam to follow the tracks.

18 Claims, 14 Drawing Sheets

F I G. 4
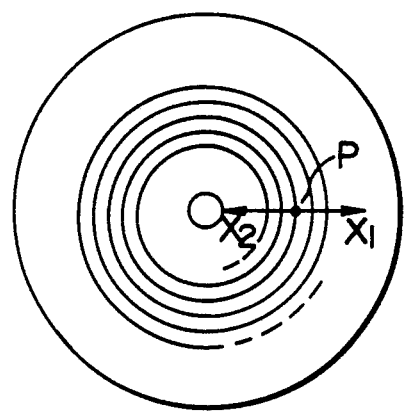
F I G. 5
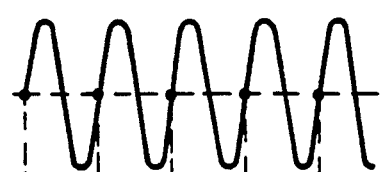 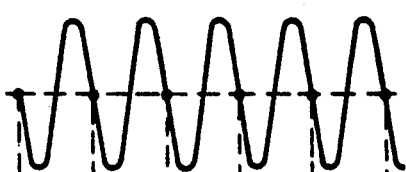
(a)
(d)
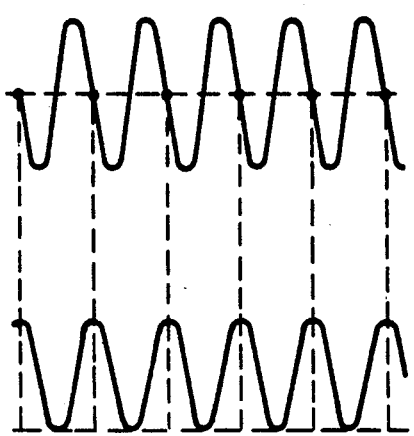

F I G. 17
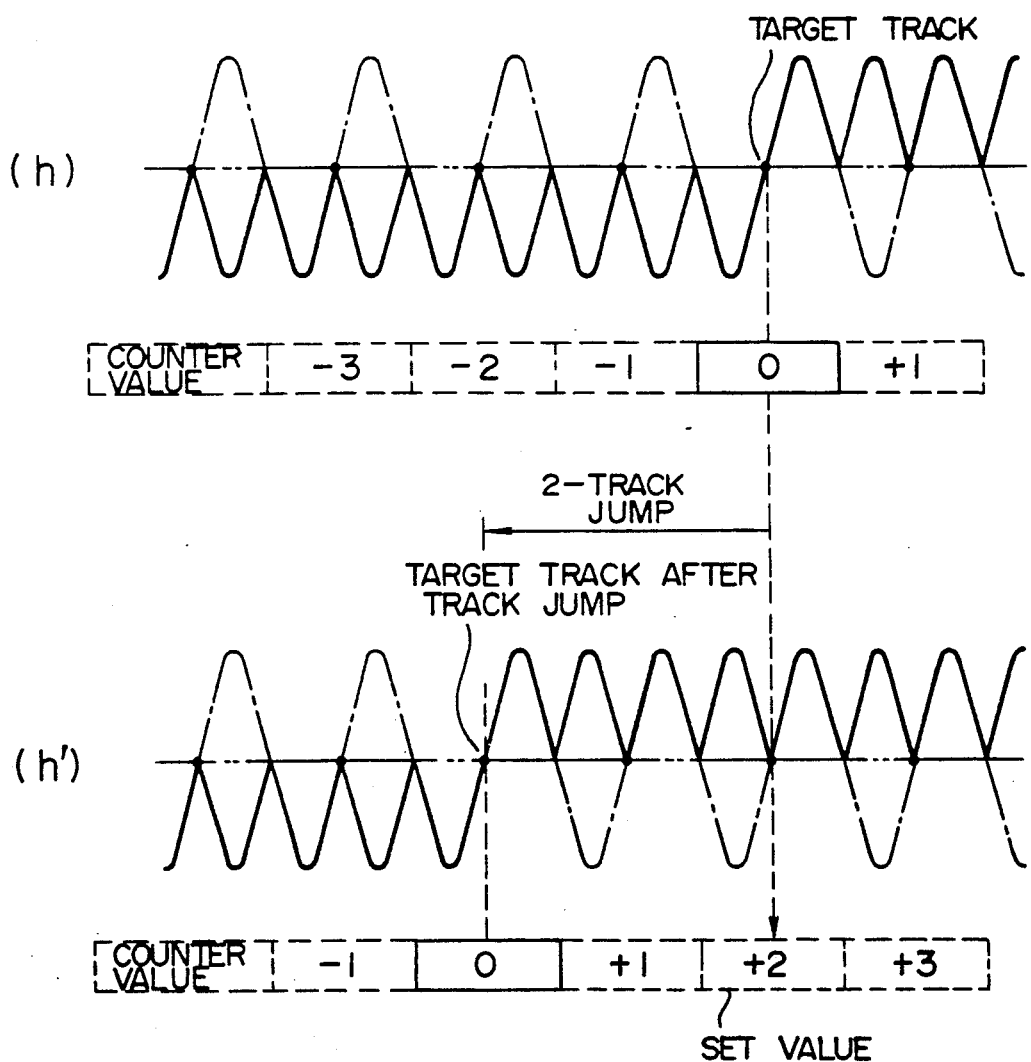

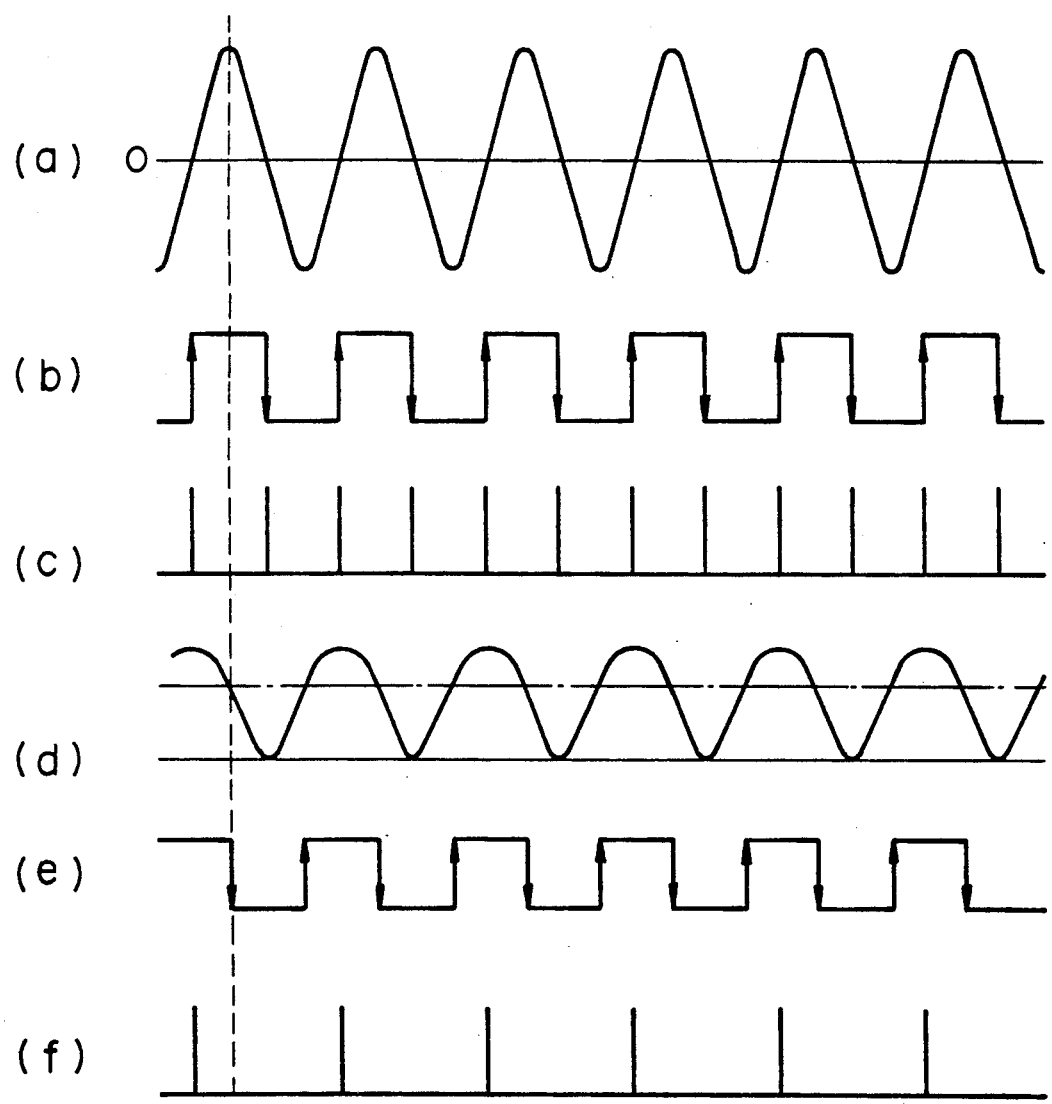

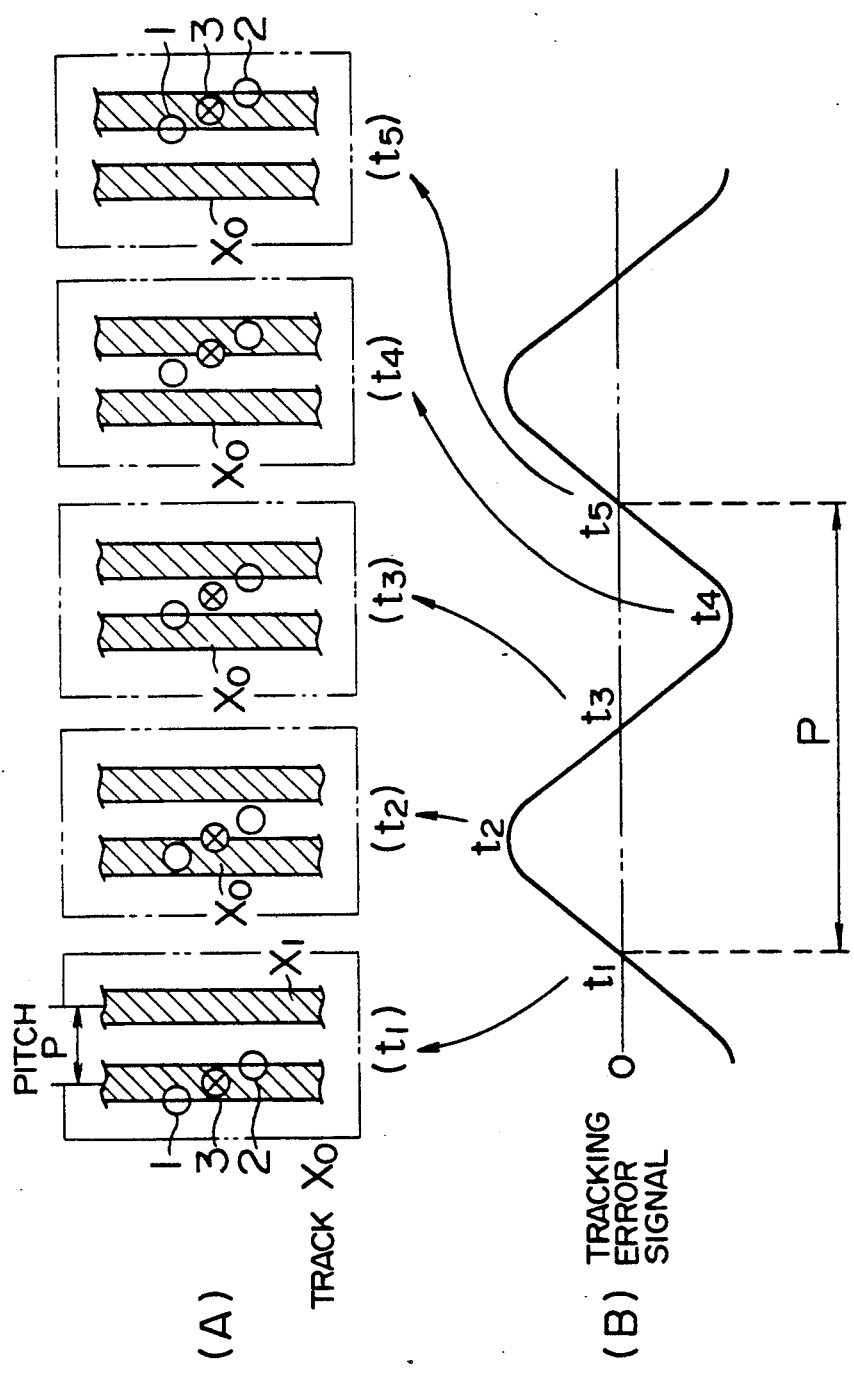

TRACKING CONTROL APPARATUS FOR CONTROLLING THE TRACKING OF A TARGET TRACK

BACKGROUND OF THE INVENTION

The present invention relates to a tracking control apparatus which is suitable for an optical disk drive, for example. More particularly, the invention relates to the tracking control apparatus which is capable of positively controlling the tracking of a target track.

Recently, there has been developed an optical or magneto-optical type recording and reproducing apparatus, which employs an optical disk or a magneto-optical disk. Such an apparatus includes a tracking actuator and an optical pickup traveling unit. The tracking actuator serves to travel an objective lens in a substantially orthogonal manner to concentric or spiral tracks in a track-following operation or a random access operation for retrieving a target track. The optical pickup traveling unit serves to travel an optical pickup having a tracking actuator in the radial direction. The track-following operation enables the actuator to be driven in accordance with a polarity or level of a tracking error signal obtained by the optical pickup so that a light beam can constantly follow the center of the track.

The random access operation, on the other hand, takes the steps of temporarily opening a tracking control loop, traveling the optical pickup to a target track with the optical pickup traveling unit, and closing the tracking control loop for enabling the optical pickup to follow a target track.

When the drawing operation is carried out for closing the tracking control loop and following the track, the control loop is often closed at a position where the light beam is slipped out of the track center, that is, the tracking error signal becomes large. In this case, the tracking actuator is accelerated toward the center of the track in accordance with the level and polarity of the tracking error signal. It results in increasing a relative speed of a target track to the light beam when the light beam reaches the track center and often slipping the light beam out of the target track too greatly to draw the light beam to the target track. In general, the control loop is closed when the light beam is impinged onto the track and the tracking error signal level is small.

Then, the description will be directed to the prior art of this type of tracking control apparatus with reference to FIG. 18.

In FIG. 18, a reading light beam 3 is reflected from an optical disk and the reflected beam is converted into a regenerative RF signal in a photoelectric converter 5. The tracking light beams 1 and 2 reflected from the optical disk are converted into electric signals $S_1$ and $S_2$ in photoelectric converters 9 and 10. These electric signals are applied to a differential amplifier 11 in which they are converted into a tracking error signal (a). The level of the tracking error signal (a) matches to how far the light beam is slipped out of the track center or the polarity of the tracking error signal (a) matches to which direction the light beam is oriented to. The tracking error signal (a) passes through an equalizer 12, a switch 13 and an amplifier 14 and goes to an actuator in which the signal functions as a driving signal. Thus, the actuator controls the travel of the light beam 3 to follow a track 4.

In the random access operation, a microcomputer 19 operates to reset a flip-flop 18. It results in opening the switch 13 and thus the tracking control loop. At a time, as the tracking control loop is open, the optical pickup traveling unit (not shown) moves the optical pickup to a target track. When the tracking control loop is open, the optical pickup supplies a tracking error signal (a) shown in FIG. 19(a).

The tracking error signal (a) is shaped into a pulse waveform (b) in a waveform shaping circuit 16. The pulse waveform (b) is applied to an edge detecting circuit 17 in which the waveform (b) is converted into an edge signal (c) (see the waveforms shown in FIG. 19(b) and (c)). On the other hand, the regenerative RF signal is sent to an envelope wave detector 6. The regenerative RF signal becomes larger as the light beam 3 comes closer to the center of the track 4 and smaller as it comes off the center. Hence, the envelope wave detector 6 supplies an envelope signal (d) shown in FIG. 19(d). The envelope signal (d) is shaped into a pulse waveform in a waveform shaping circuit 7. The resulting pulse waveform is an on-track signal (e) which indicates if the reading light beam 3 is spotted on the track or between tracks (see the waveform shown in FIG. 19(e)). The edge signal (c) and the on-track signal (e) are applied to an AND gate 8 from which a signal (f) is output. The signal (f) indicates the light beam 3 is spotted on the center of the track (see the waveform shown in FIG. 19(f)).

When starting the random access operation, the microcomputer 19 operates to reset the flip-flop 18, up-down count a pulse sent from the AND gate 8, and monitor where above the track the optical pickup is located. As the optical pickup comes closer to a target track, the microcomputer 19 decelerates the optical pickup. Then, when the optical pickup reaches the target track, the microcomputer 19 operates to de-reset the flip-flop 18, when the signal (f) sets the flip-flop 18. At a time, the switch 13 is turned on so that the control loop is closed, thereby drawing the light beam to the target track.

The patents relating to this type of apparatus have been disclosed in the Official Gazettes of Japanese Patent Laid-open Nos. 58-57640 and 56-58141.

The drawing operation of the prior art is designed to close the tracking control loop when the reading light beam 3 is spotted on the track as shown in FIG. 20A. However, though the relative position of the light beam 3 to the track $X_0$ is zero, in actual, some factors such as eccentricity of an optical disk cause a certain degree of relative speed $V_0$ to occur. If the tracking control loop is closed as keeping the relative speed, the allowable range of the relative speed $V_0$ for positively drawing the light beam to the target track is within a drawing speed defined by a band range on which the tracking control is implemented. If the relative speed $V_0$ is larger than the drawing speed defined by that band range, it is unstable to draw the light beam to the target track. It results in often bringing about a phenomenon that the light beam is drawn to a spot slipped out of the target track.

Next, this shortcoming will be detailed as taking an example of the random access operation.

For the purpose of traveling the light beam, the random access operation takes a step of traveling the optical pickup orthogonally to the tracks with the optical pickup traveling unit. To speed up the access operation, it is necessary to generate a large acceleration with the optical pickup traveling unit, resulting in greatly accelerating the objective lens. In case the objective lens is greatly accelerated, the reaction against the acceleration or deceleration changes the position of the objective lens, because the objective lens is normally supported by a spring. In particular, in decelerating the objective lens, the reaction displaces the objective lens so that the objective lens is reversely accelerated by the restoring force of the spring, thereby increasing the relative speed of the light beam to the target track.

The tracking error signal, in general, is a sinuous waveform as shown in FIG. 20(B). The sinuous waveform corresponds to the relative position of the light beam to the target track. That is, when the relative position of the reading light beam 3 against the target track travels past ¼ of a track pitch P (time $t_2$), the error signal level is decreased. When the relative position further travels past P/2 (time $t_3$), the error signal polarity is changed so that the force exerted onto the actuator is oriented in an opposite direction to the target track. FIG. 20(A) shows the position of the light beam 3 at each time $t_1$ to $t_5$.

When the optical pickup is located above the target track, if the relative speed is large as mentioned above, it is often impossible to draw the light beam 3 to the track by closing the tracking control loop, because the relative position is within P/2 and thus the relative speed is not reduced to zero. In such a case, the light beam is jumped over the target track and drawn to another track. This shortcoming results from the fact that the tracking error signal is such a sinous wave as including a lot of stable points.

SUMMARY OF THE INVENTION

It is therefore an object of the present invention to provide a tracking control apparatus for a recording and reproducing apparatus which is capable of stably and positively drawing a reading light beam to a target track even if a high-speed random access operation is carried out under the large relative speed.

To achieve the foregoing object, according to an aspect of the invention, the tracking control apparatus is designed to detect the relative slippage of a light beam to a target track and the slipping direction from a tracking error signal and a regenerative RF signal and to output as a tracking error signal a signal having a predetermined level matching to the slippage of the light beam to the target track and the slipping direction, if the light beam is slipped out of the target track.

When opening the tracking control loop, in case of traveling the light beam from the inside to the outside of the optical disk, the regenerative RF signal becomes maximum at a phase of the tracking error signal, while in case of traveling the light beam from the outside to the inside, the regenerative RF signal becomes maximum at another phase of the tracking error signal. This phase difference, thus, contributes to detection of the relative slippage of the light beam to the target track and the slipping direction. Based on the detection signal, the tracking error signal is formed to have such a level as matching to the slippage of the light beam to the target track and the slipping direction, if any. One example of the signal is shown by a real line of FIG. 3(h). As a result, the tracking control apparatus designed according to the invention reduces the tracking error signal to zero only at a target track as shown by a real line of FIG. 3(h). Hence, the apparatus has just one stable point at which the light beam is allowed to be drawn. On the other hand, the prior art reduces the tracking error signal to zero at several points including the target track, because the tracking error signal is formed as a sinous waveform shown in FIG. 3(a). It means that there exist a lot of stable points at which the light beam is allowed to be drawn to the corresponding tracks.

Moreover, the tracking control apparatus designed according to the invention does not bring about decrease of the error signal level and switching of the error signal polarity even if the light beam is slipped by P/4 or more out of the target track. It results in constantly applying to the actuator the force toward the target track and positively allowing the light beam to be drawn to the target track.

DESCRIPTION OF THE DRAWINGS

FIG. 4 is a view showing the direction of a radiant beam being traveled on an optical disk;

FIG. 5 is a view illustrating a tracking error signal waveform and an envelope signal waveform;

FIG. 17 is a view showing how a track jump is done in the waveform converting circuit shown in FIG. 12;

FIG. 19 is a view showing several operating waveforms used in the tracking control apparatus in FIG. 18; and FIG. 20 is a view showing positional relation between a track and a beam and a tracking error waveform.

DESCRIPTION OF THE PREFERRED EMBODIMENTS

Figure 1:
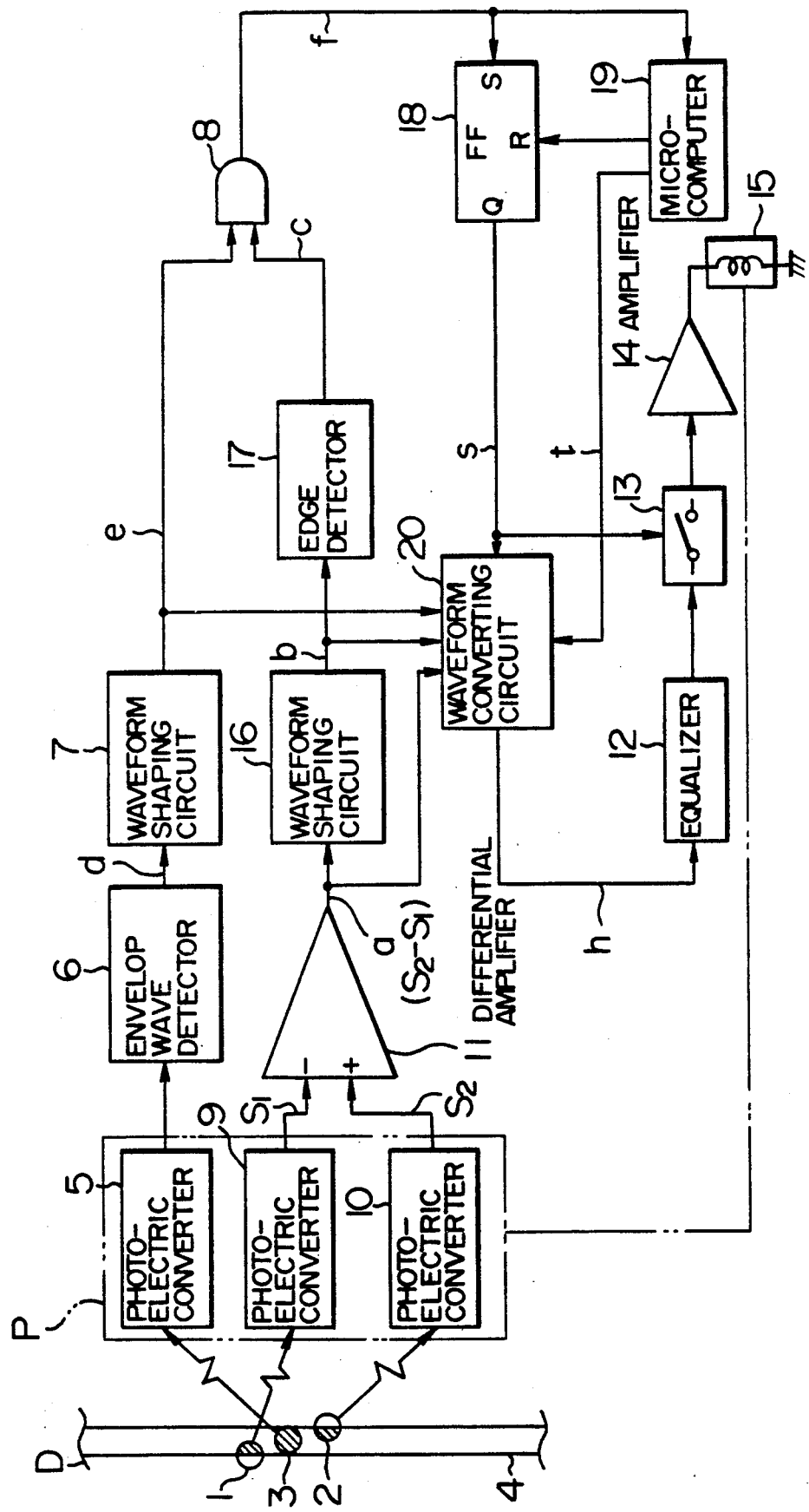
FIG. 1 is a block diagram showing a tracking control apparatus according to a first embodiment of the invention.
Figure 18:
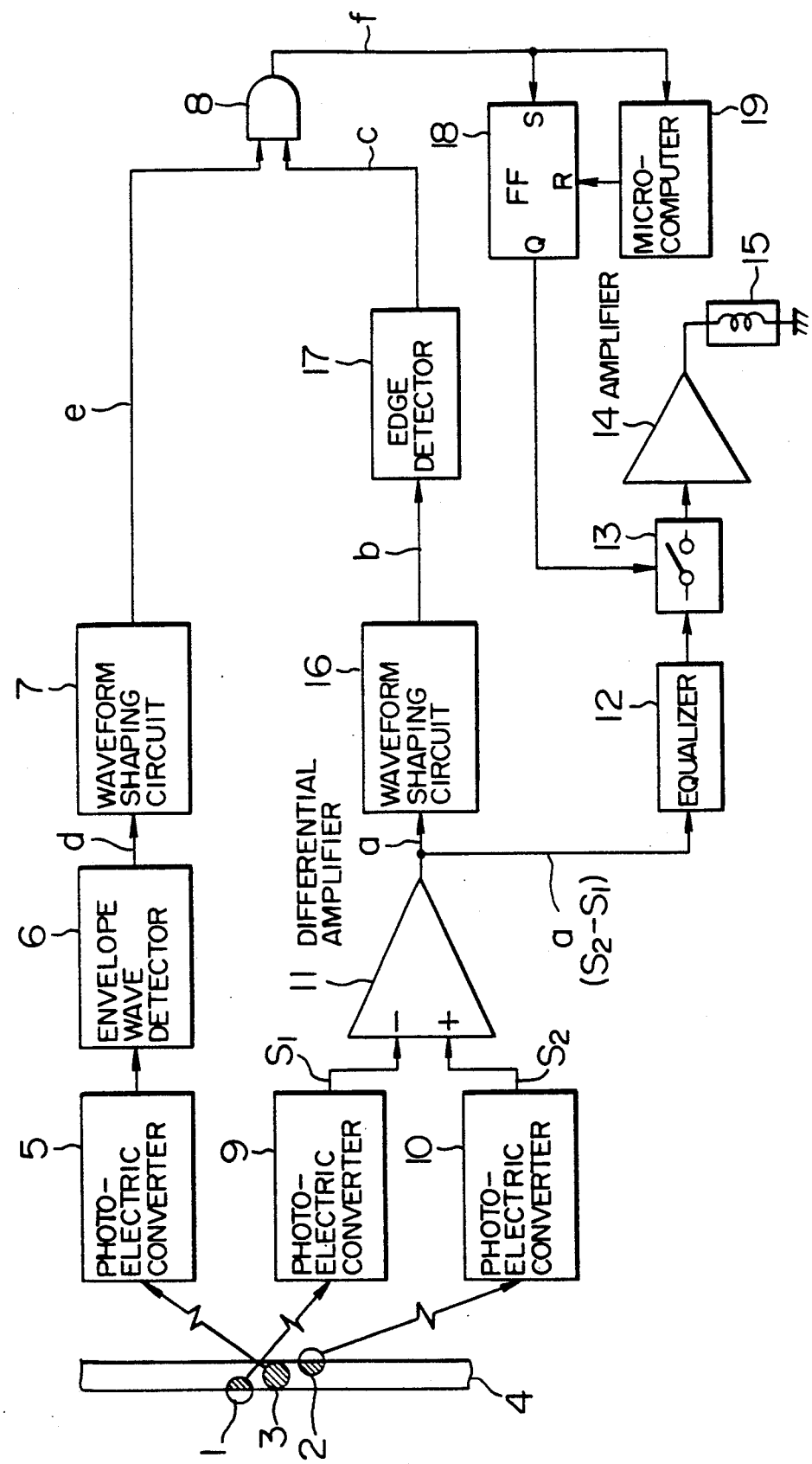
FIG. 18 is a block diagram showing a conventional tracking control apparatus.

Hereinafter, the present invention will be described on the embodiments shown in the drawings. FIG. 1 is a block diagram showing a tracking control apparatus. In FIG. 1, the same numbers as those in 18 indicate the same functional sections as those in 18 illustrating the prior art. The description about those functional sections is left out in principle. signal waveforms used in the sections of FIG. 1 matching to those of FIG. 18 are identical to those shown in 19.

In FIG. 1, the reading light beam 3 is reflected on the optical disk D and is applied to a converter 5 in which the reflected light is converted into an electric signal, that is, a regenerative RF signal The regenerative RF signal is sent to an envelope wave detector 6 in which it is converted into an envelope signal (d). The envelope signal (d) is shaped into an on-track signal (e) in a waveform shaping circuit 7. The on-track signal (e) indicates if the reading light beam 3 is spotted onto a track or between tracks. On the other hand, the tracking beams 1 and 2 are reflected on the optical disk and are entered into photoelectric converters 9 and 10, respectively. The converters 9 and 10 supplies signals $S_1$, $S_2$ to a differential amplifier 11 in which these signals $S_1$, $S_2$ are converted into a tracking error signal (a). The photoelectric converters 5, 9, 10 are included in an optical pickup P. The tracking signal (a) is converted into a pulse signal (b) in a waveform shaping circuit 16. The pulse signal (b) is sent to an edge detecting circuit 17 in which it is converted into an edge signal (c). Then, the edge signal (c) and the on-track signal (e) are applied to an AND gate. The output signal of the AND gate 8 is sent to a terminal of a flip-flop 18. The flip-flop 18 supplies an output signal (s) to a switch 13 and a waveform converting circuit 20. In the switch 13, this signal (s) is used for controlling on and off of the switch. On the other hand, the waveform converting circuit 20 receives the signal (s) sent from the flip-flop 18, the on-track signal (e) sent from the waveform shaping circuit 7, a pulse signal (b) sent from the waveform shaping circuit 16, a tracking error signal (a) sent from the operational amplifier 11, and a signal (t) sent from a microcomputer 10. The signal (t) is used when a track jump (to be described later) is done. The waveform converting circuit 20 produces a signal (h) having a converted waveform. The signal (h) is sent to an actuator 15 through an equalizer 12, a switch 13 and an amplifier 14. The signal (h) functions as a driving signal of the actuator. In response to the signal (h), the actuator drives the optical pickup P to control tracking of a light beam.

Figure 2:
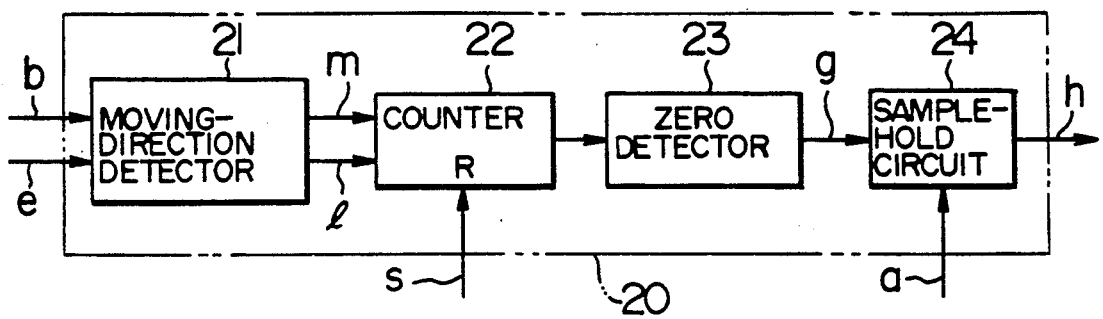
FIG. 2 is a block diagram showing a first embodiment of a waveform converting circuit.

FIG. 2 is a block diagram showing a first embodiment of the waveform converting circuit 20 shown in FIG. 1. As shown, the waveform converting circuit 20 shown in FIG. 1. As shown, the waveform converting circuit 20 includes a traveling-direction detecting circuit 21, an up-down counter 22, a zero detecting circuit 23 and a sample-hold circuit 24. At first, how to detect the traveling direction of the light beam 3 will be detailed before the discussion of the traveling-direction detecting circuit 21.

FIGS. 4 and 5 are views for describing how to detect the traveling direction of the light beam.

In FIG. 4, when the light beam 3 is traveled from P to $X_1$, that is, toward the outside, as shown in the left hand of FIG. 5, the envelope signal (d) has the maximum level at a zero-cross point located on the way of increasing the level of the tracking error signal (a). On the other hand, when the light beam 3 is traveled from P to $X_2$, that is, toward the inside, as shown in the right hand of FIG. 5, the envelope signal (d) has the maximum level at a zero-cross point on the way of increasing the level of the tracking error signal (a). It means that the traveling direction of the light beam can be detected by checking the relation between the tracking error signal (a) and the envelope signal (d).

Figure 6:
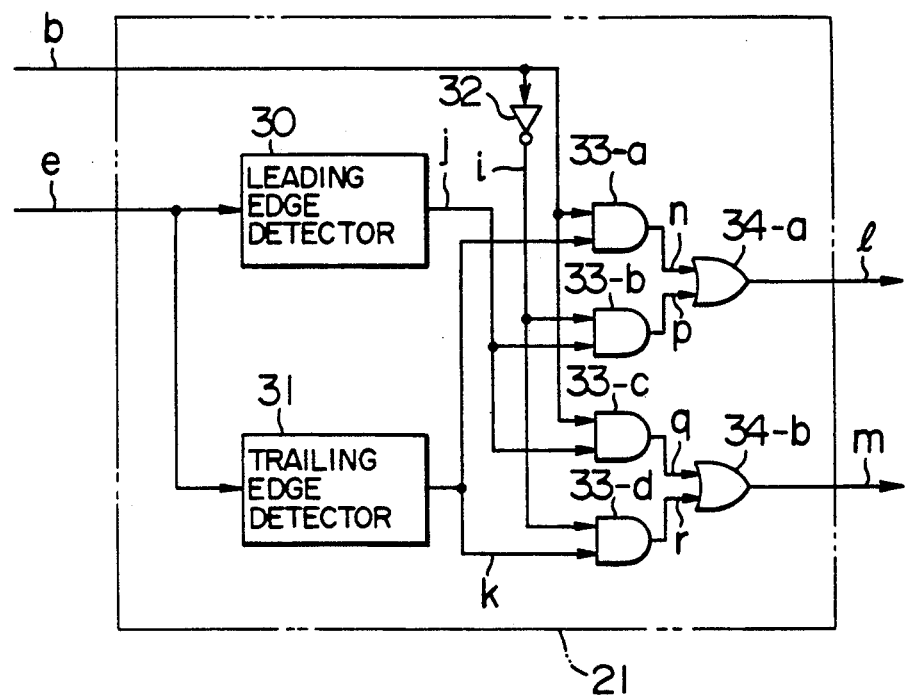
FIG. 6 is a block diagram showing a traveling-direction detecting circuit included in a waveform converting circuit.

FIG. 6 shows one example of the traveling-direction detecting circuit 21 shown in FIG. 2. The detecting circuit 21 employs the foregoing method. The operation of the circuit 21 will be described with reference to the waveform view showing the operation of each section.

The tracking error signal (a) and the envelope signal (d) are waveform-shaped into the pulse signal (b) and the on-track signal (e), respectively. For detecting the traveling direction of the light beam 3, it is necessary to detect the level of the pulse signal (b) and the leading edge and the trailing edge of the on-track signal (e). The on-track signal (e) is input to a leading edge detecting circuit 30 and a trailing edge detecting circuit 31 in which the signal (e) is converted into signals (j) and (k). The pulse signal (b) is partially input to an inverter 32 in which the signal (b) is logic-inverted to form a pulse signal (i).

Figure 7:
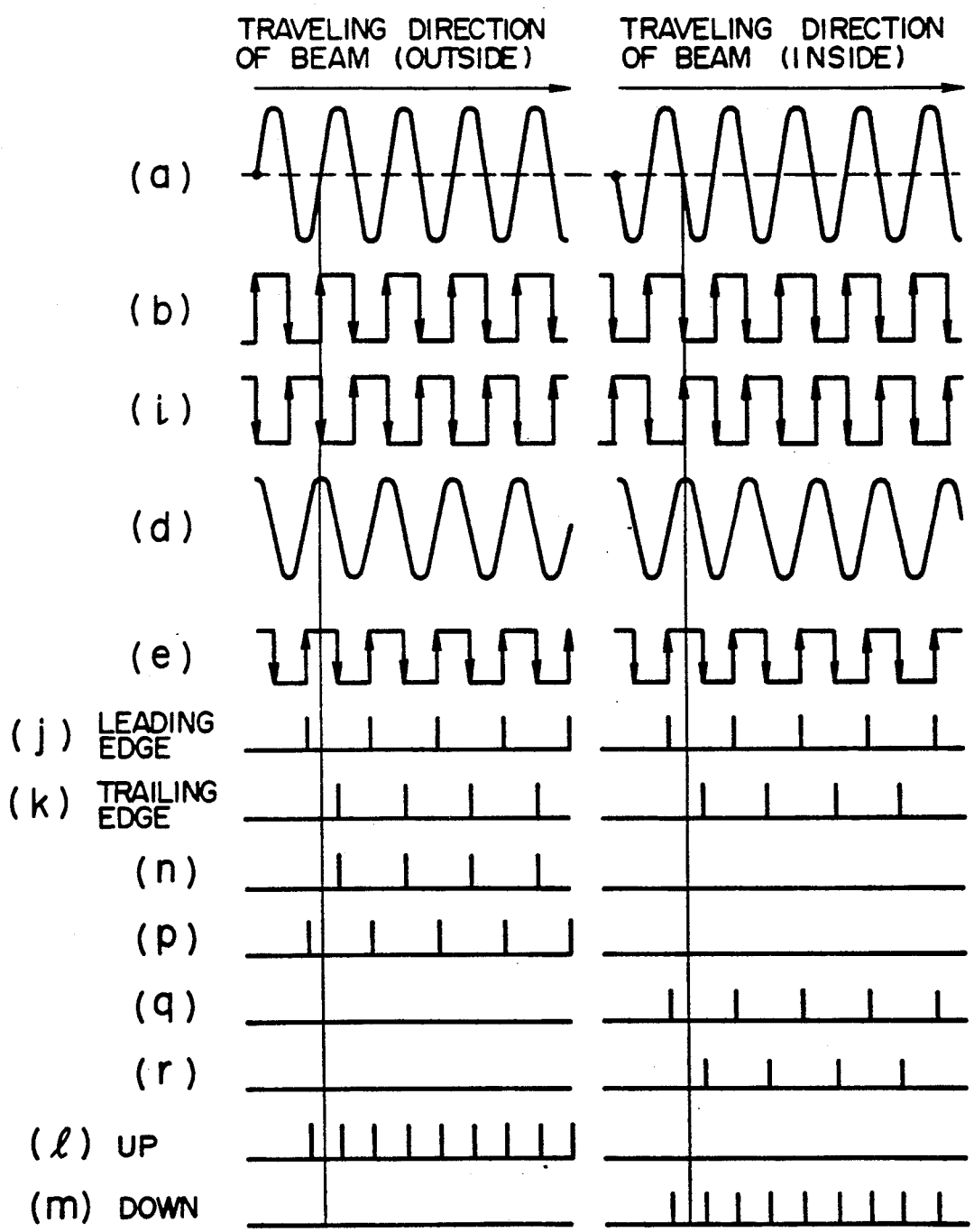
FIG. 7 is a view illustrating several operating waveforms used in the traveling-direction detecting circuit shown in FIG. 6.

The pulse signal (b) and the trailing edge signal (k) are input to an AND gate 33-*a*. The AND gate 33-*a* detects the trailing edge formed when the light beam 3 travels toward the outside of the optical disk and supplies a trailing edge detecting signal as shown FIG. 7(*n*) And, the pulse signal (i) and the leading edge detecting signal (j) are applied to an AND gate 33-*b*, which detects the leading edge formed when the light beam 3 travels toward the outside of the optical disk. The AND gate 33-*b* outputs the leading edge detecting signal as shown in FIG. 7(*O*). The output signal (n) on the AND gate 33-*a* and the output signal (p) of the AND gate 33-*b* are input to an OR gate 34-*a*. The OR gate 34-a outputs an UP signal (l) indicating the light beam 3 is traveled toward the outside.

The pulse signal (b) and the leading edge detecting signal (j), on the other hand, are input to an AND gate 33-*c*, which detects the leading edge formed when the light beam 3 travels toward the inside of the optical disk. The AND gate 33-*c* outputs a leading edge detecting signal shown in FIG. 7(*q*). The pulse signal (i) and the trailing edge detecting signal (k) are input to an AND gate 33-*d*, which detects the trailing edge formed when the light beam 3 travels toward the inside of the disk. The AND gate 33-*d* outputs the trailing edge detecting signal shown in FIG. 7(*r*). The output signal (q) of the AND gate 33-*c* and the output signal (r) of the AND gate 33-*d* are input to an OR gate 34-*b*, which a DOWN signal (m) indicating the light beam 3 travels toward the inside of the track.

Figure 3:
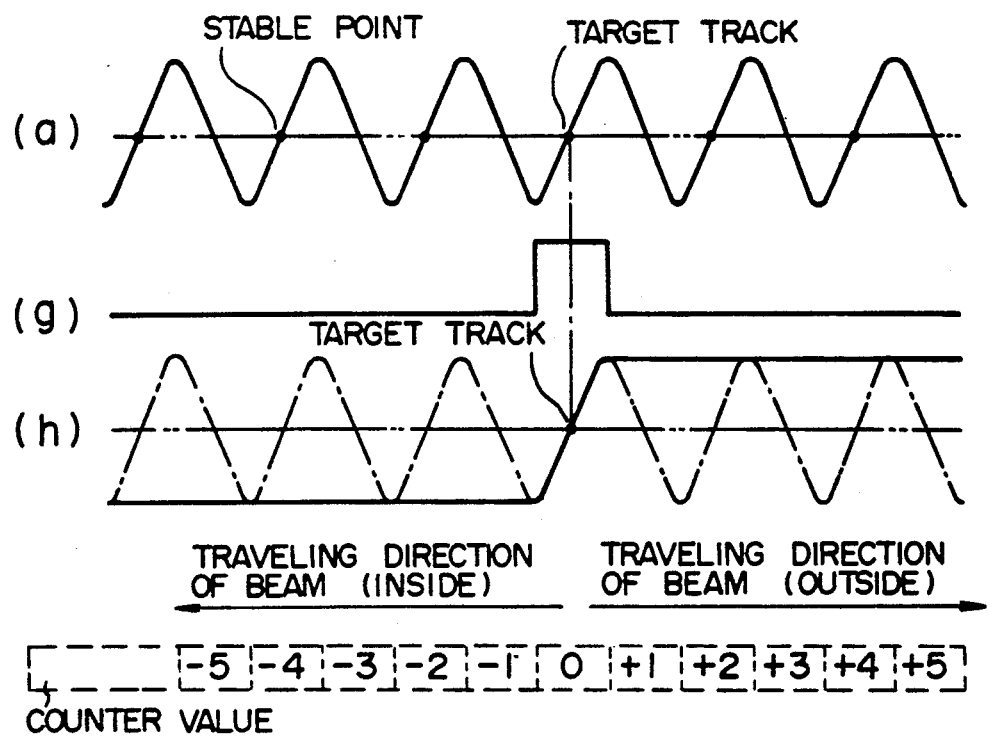
FIG. 3 is a view illustrating tracking error signals according to the arrangement of FIG. 2.

As shown in FIG. 2, the UP signal (1) and the DOWN signal (m) are input to the up-down counter 22. When the light beam reaches the target track, the up-down counter 22 resets a count value to zero in response to the signal (s) sent from the flip-flop 18 shown in FIG. 1. Then, the counter 22 serves to perform the up-down counting with the UP signal (1) and DOWN signal (m) for detecting the slippage of the light beam out of the target track and the slipping direction. The zero detecting circuit 23 serves to detect whether or not the value of the counter 22 is zero and output the sample-and-hold control signal (g) as shown in FIG. 3(g) to the sample-hold circuit 24. The sample-hold circuit 24 enters into a sampling state when the counter 22 has a value of zero and into a holding state when it does not have a value of zero, that is, the light beam 3 is slipped out of the target track by ±P/4 or more, for example. In the case, hence, the sample and hold circuit 24 serves to hold an error signal level given in the state. It results in the sample-hold circuit 24 outputting a tracking error signal (h) shown by a real line of FIG. 3(h) unlike the conventional error signal shown by a broken line of FIG. 3(h).

Even when the light beam 3 is slipped out of the target track by ±P/4 or more, therefore, the error signal level is kept stable unlike the conventional error signal level shown in FIG. 3(a). Further, even when the light beam 3 is slipped by ±P/2 or more, the error signal keeps its polarity. Hence, even by closing the tracking control loop, the force toward the target track is applied to the actuator so that the light beam can be drawn to the target track.

Figure 8:
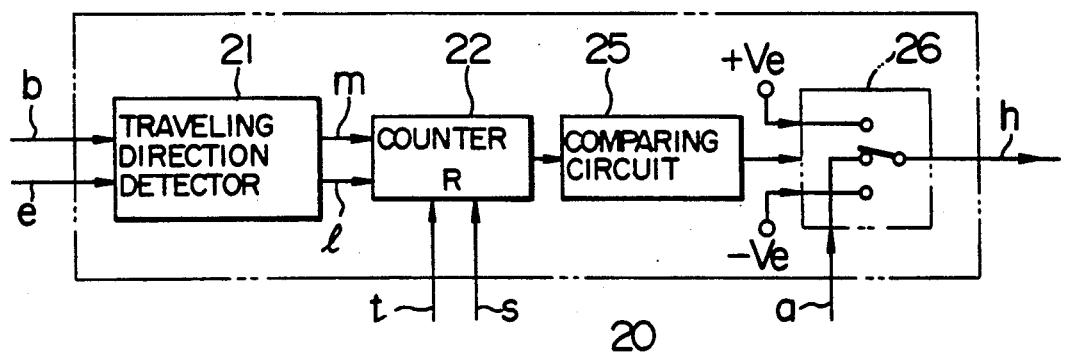
FIG. 8 is a block diagram showing a second embodiment of the waveform converting circuit.

FIG. 8 is a block diagram showing a second embodiment of the waveform converting circuit 20 shown in FIG. 1. The same functional sections in FIG. 8 as those in FIG. 2 are referenced by the same numbers. The description about these functional sections is left over in principle.

The waveform converting circuit 20 shown in FIG. 8 includes a traveling-direction detecting circuit 21, an up-down counter 22, a comparing circuit 25, and a selecting switch 26.

Figure 9:
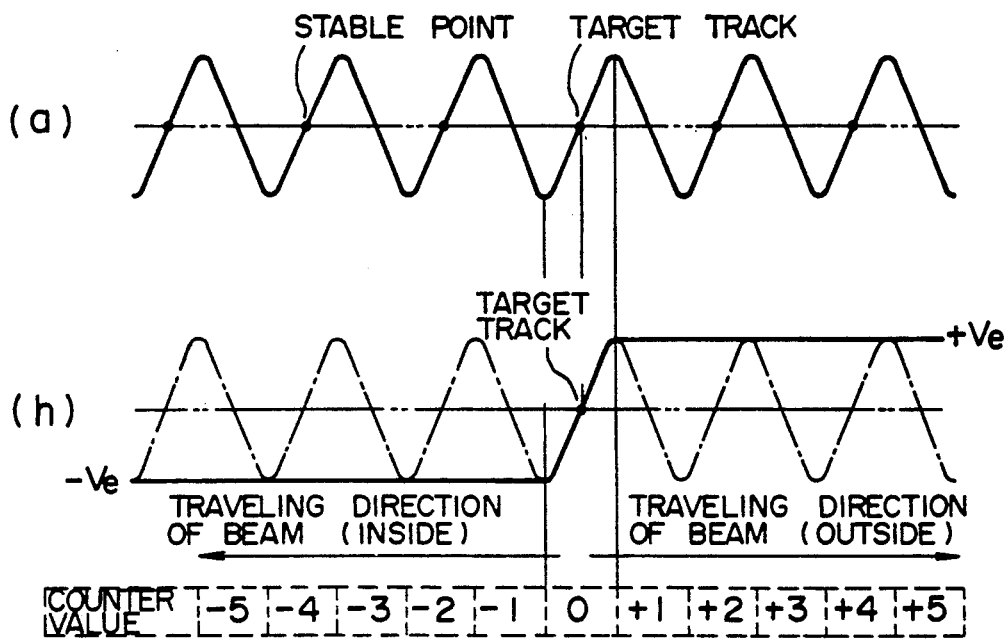
FIG. 9 is a view illustrating tracking error signal waveforms used in the waveform converting circuit.

The up-down counter 22 supplies a signal to a comparing circuit 25, which detects if the counter 22 has a value of zero, a positive value, or a negative value based on the signal. Based on the output signal of the comparing circuit 25, the switch 26 serves to select a tracking error signal (a) if the counter has a value of zero, a signal having a predetermined level −Ve if the counter has a negative value, or a signal having a predetermined level +Ve if the counter has a positive value. With the function, the switch 26 can select a proper signal having a predetermined level ±Ve if the light beam is slipped out of the target track by ±P/4 or more. The switch 26 supplies a tracking error signal (h) as shown by a real line of FIG. 9(h) unlike the conventional error signal shown by a broken line of FIG. 9(h).

Figure 10A:
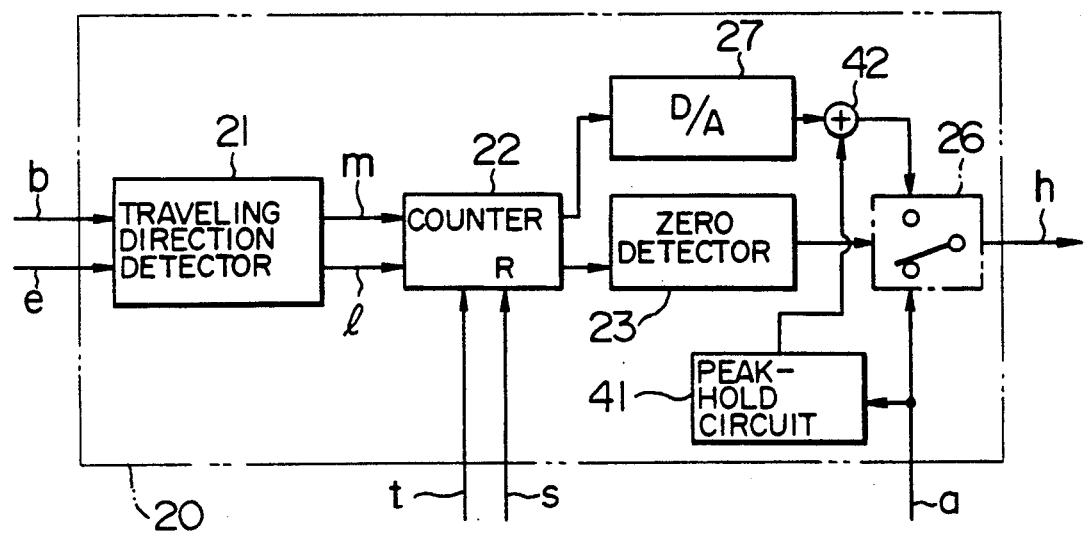
FIGS. 10A and 10B are block diagrams showing a third embodiment of the waveform converting circuit.

FIG. 10A is a block diagram showing a third embodiment of the waveform converting circuit 20 shown in FIG. 1. The same functional sections in FIG. 10 as those in FIG. 8 are referenced by the same numbers. The description about these functional sections is left over in principle.

As shown in FIG. 10A, the waveform converting circuit 20 includes a traveling-direction detecting circuit 21, an up-down counter 22, a zero detecting circuit 23, a selecting switch 26, a digital-to-analog converter 27, a peak hold circuit 41, and an adding circuit 42.

Figure 11:
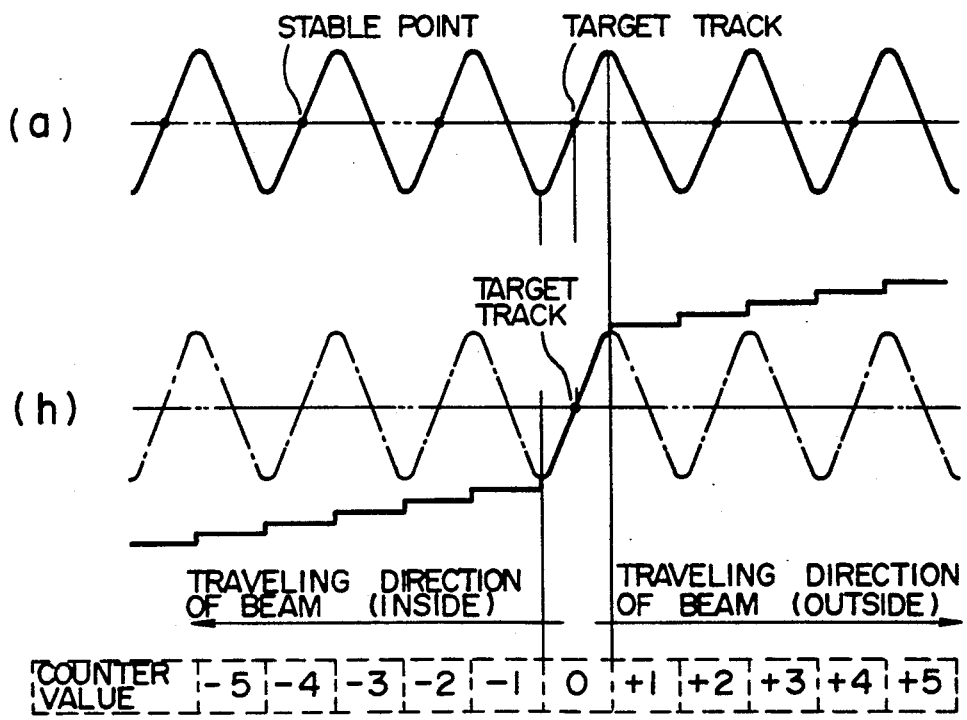
FIG. 11 is a view illustrating tracking-error detecting signals used in the waveform converting circuit shown in FIGS. 10A and 10B.

The up-down counter 22 supplies a signal to the zero detecting circuit 23 and the digital-to-analog converter 27. The digital-to-analog converter 27 supplies a signal matching to the value of the counter 22. The zero detecting circuit detects whether the value of the counter 22 is zero or not. Based on the output signal of the zero detecting circuit 23, the switch 26 serves to select a tracking error signal (a) output by the differential amplifier 11 if the value of the counter 22 is zero or an output signal of the adding circuit 42 if the value of the counter 22 is not zero. Hence, if the light beam is slipped out of the target track by ±P/4 or more, the switch 26 can select a signal matching to the slippage, because the peak hold circuit holds both of positive and negative peak values and the adding circuit 42 adds the peak value to the output of the digital-to-analog converter 27. The switch 26 supplies a tracking error signal (h) as shown by a real line of FIG. 11(h) unlike the conventional error signal shown by a broken line FIG. 11(h).

As is understood from the above description, this embodiment is designed to control the tracking error signal level depending on the relative slippage of the light beam to the target track by referring the value of the counter. Hence, the embodiment is capable of changing the magnitude of force exerted toward the target track, thereby improving the tracking and drawing performance.

Figure 10B:
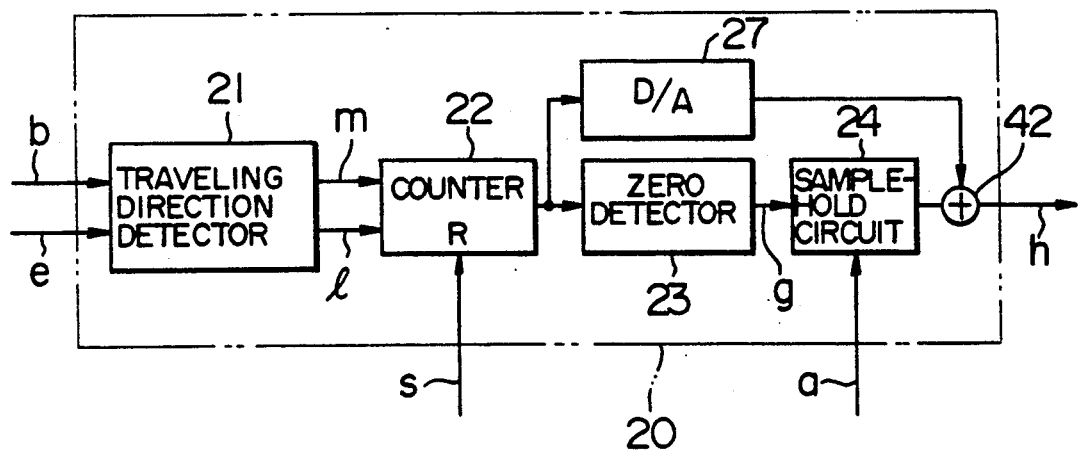

Another embodiment is shown in FIG. 10B. This embodiment is the circuit shown in FIG. 2 further including a digital-to-analog converter 27 and an adding circuit 42. The embodiment operates as the circuit shown in FIG. 10A does and supplies a tracking error signal (h) shown by the real line of FIG. 11(h).

Figure 12:
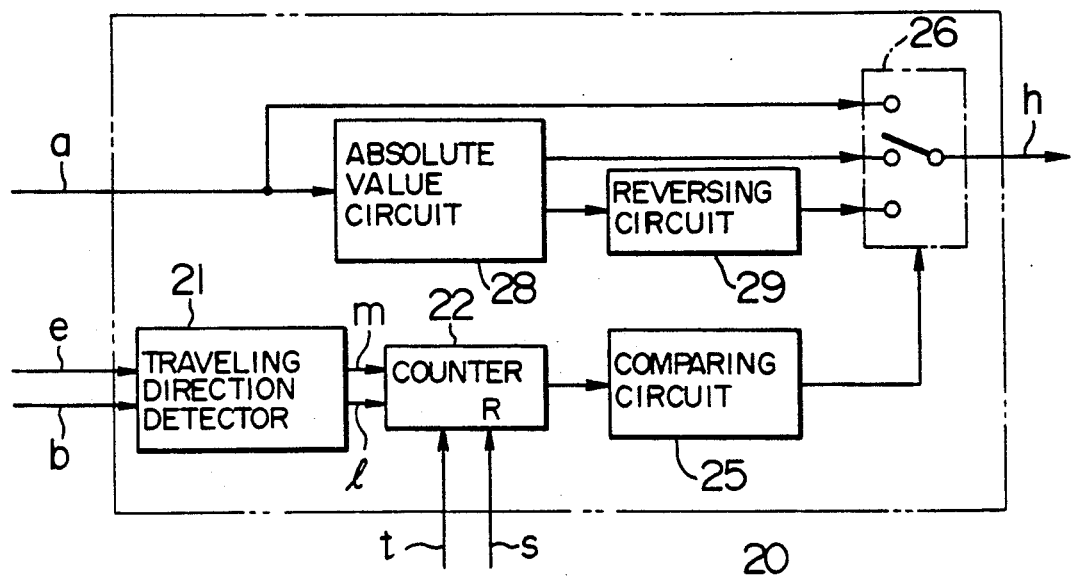
FIG. 12 is a block diagram showing a fourth embodiment of the waveform converting circuit.

FIG. 12 is a block diagram showing a fourth embodiment of the waveform converting circuit 20 shown in FIG. 1. The same functional sections in FIG. 12 as those in FIG. 8 are referenced by the same numbers. The description about these functional sections is left in principle.

Figure 13:
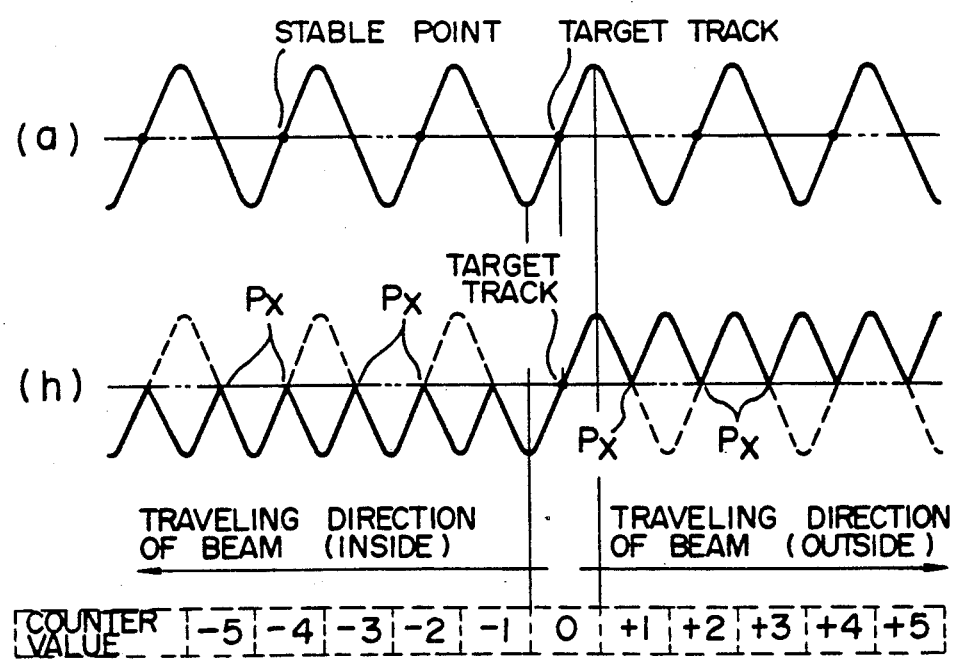
FIG. 13 is a view illustrating tracking-error detecting signals used in the waveform converting circuit shown in FIG. 12.

As shown in FIG. 12, the waveform converting circuit 20 includes a traveling-direction detecting circuit 21, an up-down counter 22, a comparing 25, a selecting switch 26, an absolute value circuit, and a reversing circuit 25. Based on the output signal of the comparing circuit 25, the switch 26 serves to select a tracking error signal (a) if the value of the counter 22 is zero, an absolute-value signal of the tracking error signal (a) given by the absolute value circuit if the value of the counter 22 is positive, or a reversed absolute-value signal of the tracking error signal (a) given by the reversing circuit 25 if the value of the counter 22 is negative. With this function, the switch 26 can select a proper signal matching to the slippage if the light beam is slipped out of the target track by ±P/2 or more. The switch 26 supplies a tracking error signal (h) shown by a real line of FIG. 13(h) unlike the conventional error signal shown by a broken line of FIG. 13(h). The light beam 3 is practically unstable on each point Px shown in FIG. 13(h). Hence, the light beam 3 is always drawn to the just-on-track spot on the target track.

Figure 14:
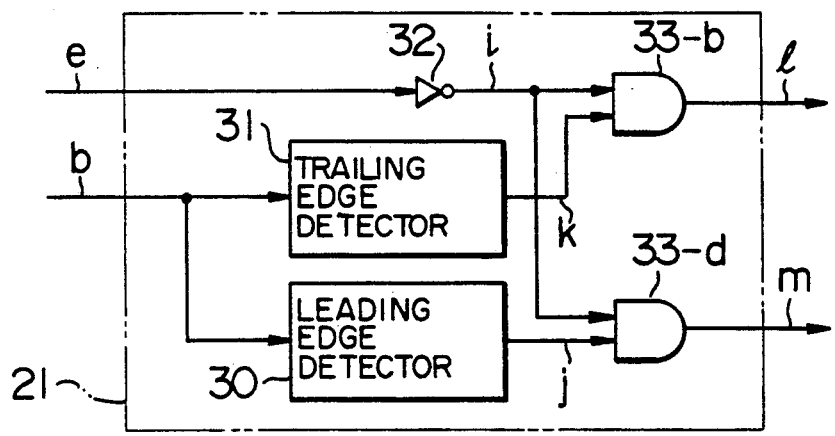
FIG. 14 is a block diagram showing another example of a traveling-direction detecting circuit included in the waveform converting circuit.
Figure 15:
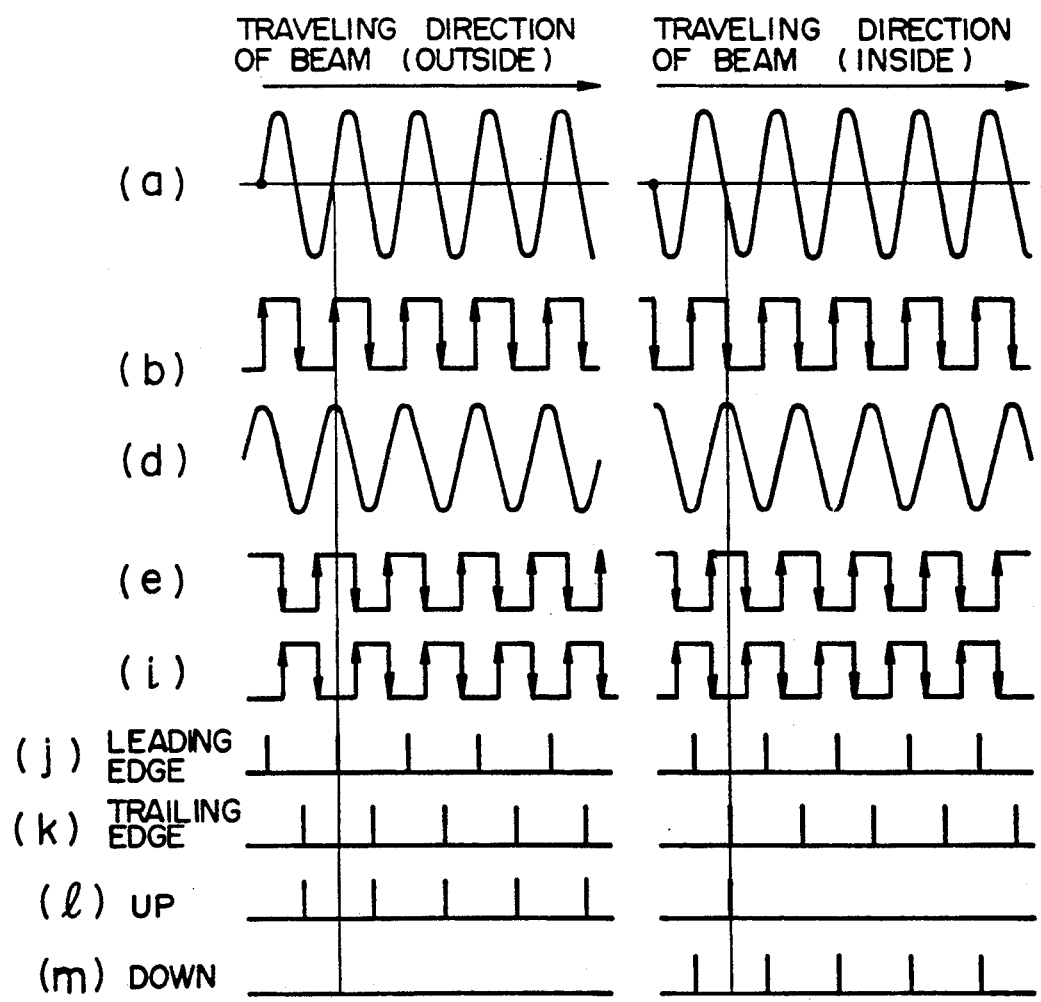
FIG. 15 is a view illustrating several operating waveforms used in the traveling-direction detecting circuit shown in FIG. 14.

FIG. 14 is a circuit showing another example of the traveling-direction detecting circuit 21 shown in FIGS. 2, 8, 10 and 12. The function will be detailed with reference to FIG. 15 illustrating the operating waveform of each section.

As set forth above, the tracking error signal (a) and the envelope signal (d) are waveform-shaped into a pulse signal (b) and an on-track signal (e). For detecting the traveling direction of the light beam, it is necessary to detect the leading and trailing edges of the pulse signal (b) and the level of the on-track signal (e). The pulse signal (b) is sent to a leading-edge detecting circuit 30 and a trailing-edge detecting circuit 31, which respectively output the leading edge signal (j) and the trailing edge signal (k). The on-track signal (e) is input to an inverter 32, which supplies a pulse signal (i) consisting of a logic-reversed on-track signal (e).

Then, the pulse signal (i) and the trailing-edge detecting signal (k) are sent to an AND gate 33-b, which supplies an UP signal (1) indicating that the light beam travels toward the outside. On the other hand, the pulse signal (i) and the leading-edge detecting signal (j) are applied to an AND gate 33-d, which supplies a DOWN signal (m) indicating that the light beam travels toward the inside.

The traveling-direction detecting circuit to be functioned in an above manner may be applied to the circuits shown in FIGS. 8, 10 and 12 without impairing the object of the invention.

The embodiments shown in FIGS. 8 and 10 make it possible to perform a track-jumping function with which the value of the up-down counter 22 is set from the outside using the signal (t) so that the stable point is moved to a target track, resulting in traveling the light beam to the target track.

Next, the track-jumping function will be described with reference to FIG. 16.

Figure 16:
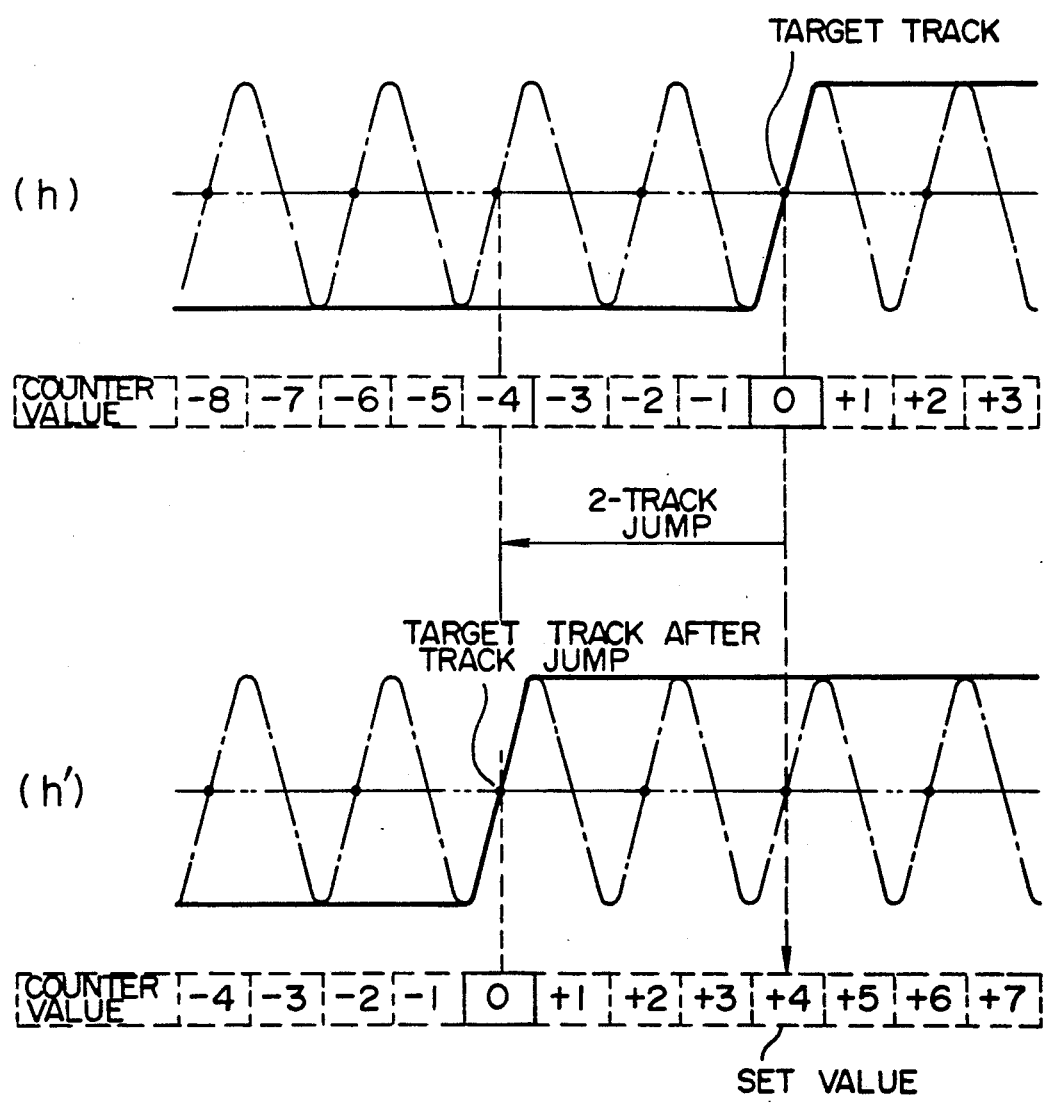
FIG. 16 is a view showing how a track jump is done in the waveform converting circuits shown in FIGS. 8 and 10.

When the target track is being reproduced, the target track is an only stable point as shown by the real line of FIG. 16(h), at which point the up-down counter 22 has a value of zero. The value of the counter 22 is set to +4 by the output signal (t) of the microcomputer 19, so that the stable point, that is, the spot at which the counter has a value of zero is relocated inside by two tracks as shown by the real line of FIG. 16(h'). The light beam 3 is traveled to the new position in a manner to allow the beam to be jumped over the tracks. Hence by setting to ±2n the value of the counter depending on the jumping direction and the number of jumped tracks, the light beam 3 is allowed to jump over ∓n tracks.

The embodiment shown in FIG. 12 makes it possible to perform a track-jumping function with which the value of the up-down counter 22 is set from the outside using the signal (t) so that the stable point is moved to a target track, resulting in traveling the light beam to the target track. This track-jumping function will be described with reference to FIG. 17.

When the target track is being reproduced, the target track is an only stable point as shown by the real line of FIG. 17(h), at which point the up-down counter 22 has a value of zero. The value of the counter 22 is set to +4 by the output signal (t) of the microcomputer 19, so that the stable point, that is, the spot at which the counter has a value of zero is relocated inside by two tracks as shown by the real line of FIG. 17(h'). The light beam 3 is traveled to the new position in a manner to allow the beam to be jumped over the tracks. Hence by setting to ±n the value of the counter depending on the jumping direction and the number of jumped tracks, the light beam 3 is allowed to jump over ∓n tracks.

According to the illustrated embodiments, the tracking-error detection employs a three-spot method and the inter-track and on-track detection employs a regenerative RF signal. Without being limited to these methods, the tracking error signal may be detected by a push-pull method in which the inter-track and on-track detection is carried out by the difference of the reflective light quantity. Or, another method may be employed. What is required in essence is to detect the slippage of the light beam out of the target track and the slipping direction. For the detection, any method may be employed.

The present invention may be applied not only the optical recording and reproducing apparatus but also an electrostatic capacity type recording and reproducing apparatus and a magnetic recording and reproducing apparatus.

As set forth above, the present invention makes it possible to produce a tracking error signal as a signal having a predetermined level matching to the slippage of the light beam out of the target track and the slipping direction of the light beam. Hence, it is capable of constantly applying the force oriented to the target track to the actuator, resulting in allowing the light beam to be drawn to the target track even if the relative speed of the track to the actuator becomes large or the acceleration to be output by the actuator is small. Further, according to the invention, the stable point equals to a target track. Hence, if the light beam is slipped out of the target track by disturbance, the beam is allowed to be drawn to the target track again. It means that the present invention has strong endurance in disturbance.

What is claimed is:

1. A tracking control apparatus comprising:
   an information recording and reproducing medium having tracks on or from which information is recorded and reproduced,
   a pickup system radiating a light beam on said information recording and reproducing medium for reproducing the information from said medium as an output signal,
   error detecting means for detecting a displacing error between one of said tracks and a spot of said light beam on said medium in an orthogonal direction to said tracks,
   on-track detecting means for detecting on the basis of the output signal from said pickup system that said spot is positioned on one of said tracks and for outputting an on-track signal,
   traveling-direction detecting means for outputting a traveling direction signal representing a detected traveling direction in which said spot is moved relative to said tracks on the basis of the displacing error from said error detecting means and the on-track signal from said on-track detecting means,
   track slippage detecting means for detecting a track-slippage on the basis of the output signal from said pickup system and the traveling direction signal from said traveling-direction detecting means and for outputting a target track on-signal representing that said spot is positioned on a target track when said spot is positioned on said target track, and for outputting a track-slippage signal representing the direction of said spot being slipped out of said target track when said spot is slipped out of said target track,
   control signal output means responsive to said target track-on signal for outputting the output signal of said error detecting means as a control signal when said spot is positioned on said target track and for outputting the track-slippage signal of said track slippage detecting means as a control signal when said spot is not positioned on said target track, and
   tracking control means for driving said pickup system in a manner to allow said spot to follow said target track based on the control signal from said control signal output means.

2. The tracking control apparatus as claimed in claim 1; wherein the on-track signal from said on-track detecting means is an on-track pulse having a pulse width matching to a period when said spot is positioned on one of said tracks.

3. The tracking control apparatus as claimed in claim 1, wherein said traveling-direction detecting means comprises;

leading-edge detecting means for detecting a leading edge of said on-track pulse, trailing-edge detecting means for detecting a trailing edge of said on-track pulse, waveform shaping means for shaping an output signal of said error detecting means into a pulse waveform; and traveling-direction signal output means for supplying said traveling-direction signal based on a leading-edge signal and a trailing edge signal of said leading and trailing-edge detecting means.

4. The tracking control apparatus as claimed in claim 3, wherein the leading edge signal output by said leading-edge detecting means is a leading edge pulse generated at a leading time point of said on-track pulse and the trailing edge signal output by said trailing-edge detecting means is a trailing edge pulse generated at the trailing time point of said on-track pulse.

5. The tracking control apparatus as claimed in claim 4, wherein said traveling-direction signal output means serves to output either one of said leading edge pulse and said trailing edge pulse when said pickup system is traveling in one direction or the other one of said leading edge pulse and said trailing edge pulse when said pickup system is traveling in the other direction.

6. The tracking control apparatus as claimed in claim 5, wherein said track-slippage detecting means comprises:

counter means for up-counting either one of said leading edge pulse and said trailing edge pulse and down-counting the other one of said pulses, resetting means for resetting said counter signal to zero respond to the on-track signal of said on-track detecting means; and means for outputting said track-slippage signal in accordance with a count value of said counter means.

7. The tracking control apparatus as claimed in claim 6, wherein said track-slippage-signal outputting means is means for outputting a signal representing track slippage oriented in one direction when the count value of said counter output means is positive and a signal representing track slippage oriented in the other direction when the count value is negative.

8. The tracking control apparatus as claimed in claim 1, wherein said track-slippage detecting means is means for sampling and holding an output signal of said error detecting means when said light beam is slipped out of said target track.

9. The tracking control apparatus as claimed in claim 1, wherein said track-slippage detecting means is means for outputting a predetermined signal representing the slipping direction when said light beam is slipped out of said target track.

10. The tracking control apparatus as claimed in claim 9, wherein said track-slippage detecting means comprises:

two voltage sources for supplying two voltage levels, first voltage level output means for supplying one voltage level supplied by one of said voltage sources when said light beam is slipped out of said target track in one direction, and second voltage level output means for supplying the other voltage level supplied by the other one of said voltage sources when said light beam is slipped out of said target track in the other direction.

11. The tracking control apparatus as claimed in claim 10, wherein said control signal output means is means for selecting said output of said error detecting means when said light beam is spotted on said target track or the voltage level supplied from said first or second level output means depending on the direction of said light beam slipped out of said target track when said light beam is not located on said target track.

12. The tracking control apparatus as claimed in claim 6, wherein said track-slippage detecting means is means for detecting a track-slippage signal representing the slippage and the slipping direction.

13. The tracking control apparatus as claimed in claim 12, wherein said track-slippage detecting means is a digital-to-analog converter for digital-to-analog converting the output of said counter means.

14. The tracking control apparatus as claimed in claim 13, wherein said track-slippage detecting means comprises:

peak-hold means for holding a peak value of the output signal supplied from said error detecting means when said light beam is slipped out of said target track; and means for adding the output signal of said peak-hold means to the output signal of said digital-to-analog converter and outputting the resulting signal as said track-slippage signal.

15. The tracking control apparatus as claimed in claim 13, wherein said track-slippage detecting means comprises:

sample-hold means for sampling and holding the output signal of said error detecting means when said light beam is slipped out of said target track; and means for adding the output signal of said sample-hold means to the output signal of said digital-to-analog converter and outputting the resulting signal as said track-slippage signal.

16. The tracking control apparatus as claimed in claim 1, wherein said track-slippage detecting means comprises:

absolute-value means for taking an absolute-value of an output signal of said error detecting means; and waveform reversing means for reversing an output of said absolute-value converting means.

17. The tracking control apparatus as claimed in claim 16, wherein said control signal output means is means for selecting the output signal of said error detecting means when said light beam is spotted on a target track, or the output signal of said absolute-value converting means or the output signal of said waveform reversing means depending on the slipping direction of said light beam when said light beam is not spotted on said target track.

18. The tracking control apparatus as claimed in claim 6 further comprising means for setting to said counter means a count value arranged to allow said light beam to jump to another target track.

* * * * *